United States Patent
Okada

(10) Patent No.: US 8,857,221 B2
(45) Date of Patent: Oct. 14, 2014

(54) OPTICAL FIBER AND METHOD AND APPARATUS FOR MANUFACTURING OPTICAL FIBER

(75) Inventor: Kenji Okada, Sakura (JP)

(73) Assignee: Fujikura Ltd., Tokyo (JP)

( * ) Notice: Subject to any disclaimer, the term of this patent is extended or adjusted under 35 U.S.C. 154(b) by 77 days.

(21) Appl. No.: 13/372,128

(22) Filed: Feb. 13, 2012

(65) Prior Publication Data

US 2012/0207439 A1   Aug. 16, 2012

(30) Foreign Application Priority Data

Feb. 14, 2011   (JP) .................................. 2011-028387

(51) Int. Cl.
| | |
|---|---|
| *C03B 37/00* | (2006.01) |
| *C03B 37/03* | (2006.01) |
| *C03B 37/027* | (2006.01) |
| *C03C 25/10* | (2006.01) |
| *G02B 6/02* | (2006.01) |

(52) U.S. Cl.
CPC ......... *C03B 37/032* (2013.01); *C03B 37/02745* (2013.01); *C03B 2203/06* (2013.01); *C03B 2203/18* (2013.01); *C03B 2203/19* (2013.01); *C03B 2205/06* (2013.01); *C03C 25/1065* (2013.01); *G02B 6/02285* (2013.01)
USPC .......................................................... 65/402

(58) Field of Classification Search
CPC .................................................. C03B 2205/06
USPC .......................................................... 65/402
See application file for complete search history.

(56) References Cited

U.S. PATENT DOCUMENTS

| | | | | |
|---|---|---|---|---|
| 4,427,717 | A * | 1/1984 | Gauthier | 427/163.2 |
| 4,572,840 | A * | 2/1986 | Gombert et al. | 427/496 |
| 5,418,881 | A * | 5/1995 | Hart et al. | 385/123 |
| 6,148,131 | A * | 11/2000 | Geertman | 385/123 |
| 6,324,872 | B1 | 12/2001 | Blaszyk et al. | |
| 6,550,282 | B2 * | 4/2003 | Roba et al. | 65/402 |
| 7,317,855 | B2 | 1/2008 | Chen et al. | |
| 7,891,216 | B2 * | 2/2011 | Cocchini et al. | 65/402 |
| 2003/0010066 | A1 * | 1/2003 | Sasaoka et al. | 65/402 |
| 2006/0133751 | A1 * | 6/2006 | Chen et al. | 385/123 |

FOREIGN PATENT DOCUMENTS

| | | |
|---|---|---|
| CN | 1083449 A | 3/1994 |
| CN | 1177111 A | 3/1998 |
| CN | 1337924 A | 2/2002 |
| CN | 1628258 A | 6/2005 |
| CN | 1849271 A | 10/2006 |
| JP | 07168067 A * | 7/1995 |
| JP | 8-295528 A | 11/1996 |

(Continued)

OTHER PUBLICATIONS

Office Action issued by Chinese Patent Office in Chinese Application No. 201210027643.6 dated Jun. 5, 2013.

(Continued)

*Primary Examiner* — Charlie Peng
(74) *Attorney, Agent, or Firm* — Sughrue Mion, PLLC

(57) ABSTRACT

An optical fiber includes a bare optical fiber portion, to which elastic torsion is applied, and a coating layer, which coats the bare optical fiber portion, is formed of curable resin, and causes elastic repulsion against resilience occurring in the bare optical fiber portion so that the elastic torsion applied to the bare optical fiber portion is held.

2 Claims, 9 Drawing Sheets

(56) References Cited

FOREIGN PATENT DOCUMENTS

| | | |
|---|---|---|
| JP | 2004-051483 A | 2/2004 |
| JP | 2004-175611 A | 6/2004 |
| JP | 2007-077329 A | 3/2007 |
| JP | 2010/122666 A | 6/2010 |
| WO | WO 2009/107667 A1 | 9/2009 |
| WO | 2009/147881 A1 | 12/2009 |

OTHER PUBLICATIONS

Chinese Office Action corresponding to Chinese Patent Application No. 201210027643.6, dated Feb. 21, 2014.

Office Action issued by Japanese Patent Office in Japanese Application No. 2011-028387 mailed Aug. 12, 2014.

* cited by examiner

OPTICAL FIBER AND METHOD AND APPARATUS FOR MANUFACTURING OPTICAL FIBER

BACKGROUND OF THE INVENTION

1. Field of the Invention

The present invention relates to an optical fiber represented by a silica glass based optical fiber and an optical fiber manufacturing method and in particular, to a technique of reducing the polarization mode dispersion (hereinafter, referred to as "PMD") of an optical fiber. Especially, the invention relates to an optical fiber, in which the amount of increase in PMD is small even if subject to interference, such as lateral pressure or bending, and a method and apparatus for manufacturing optical fiber.

Priority is claimed on Japanese Patent Application No. 2011-028387, filed Feb. 14, 2011, the content of which is incorporated herein by reference.

2. Description of Related Art

As is well known, a PMD is a phenomenon in which a propagation time difference (delay difference) occurs between two orthogonal polarization mode components in an optical fiber.

In addition, if a PMD increases, waveform deterioration occurs in signal light transmitted through the fiber in digital transmission, therefore, it becomes difficult to separate adjacent pulses from each other. As a result, a problem occurs in that problems arise such as the transmission capacity becoming limited.

Therefore, suppressing a PMD as much as possible is desired.

In addition, a PMD is caused by the optical anisotropy of an optical fiber. The causes of the occurrence of PMD are largely divided into internal factors, in which the optical anisotropy is caused by the internal structure, material, and the like of the optical fiber, and external factors, in which the optical anisotropy is caused by the stress from the outside of the optical fiber and the like.

The most high-impacting of the internal factors is the cross-sectional shape of the optical fiber.

On the other hand, in the manufacture of optical fibers, it is difficult in practice to realize a completely circular cross-sectional shape including the core of the optical fiber and the cladding around the core regardless of which fiber preform manufacturing method and method of manufacturing a bare optical fiber by drawing (fiber drawing) a fiber preform are selected.

Therefore, the actual product has a cross-sectional shape distorted to, for example, a slightly elliptical shape.

If the anisotropy of such a cross-sectional shape becomes large, the refractive index distribution in the cross section is no longer a completely concentric circle. Accordingly, birefringence occurs, and this increases PMD.

On the other hand, stress applied anisotropically, such as stress caused by bending or lateral pressure applied to the optical fiber from the outside, may be mentioned as the most high-impact of the external factors. The birefringence also occurs due to such anisotropic stress applied from the outside, and this increases PMD.

By the way, in order to reduce PMD of the optical fiber, applying torsion to the optical fiber is effective, and methods disclosed in Japanese Unexamined Patent Application Publication No. H8-295528, U.S. Pat. No. 6,324,872, WO2009/107667, Japanese Unexamined Patent Application Publication No. 2010-122666, and U.S. Pat. No. 7,317,855 have been proposed.

Among them, Japanese Unexamined Patent Application Publication No. H8-295528 and U.S. Pat. No. 6,324,872 disclose a method of applying torsion before an optical fiber preform is solidified, at the time of drawing of a bare optical fiber, so that the torsion is permanently fixed.

The above method is a method of giving a bare optical fiber the torsion as plastic deformation (plastic torsion) so that the torsion is maintained as it is, even if the external force on the optical fiber is removed, that is, a method of maintaining the torsional state as permanent deformation.

Hereinafter, such a plastic torsion which remains as permanent deformation may be called a "span".

On the other hand, WO2009/107667, Japanese Unexamined Patent Application Publication No. 2010-122666, and U.S. Pat. No. 7,317,855 disclose a method of applying the torsion to an optical fiber after the optical fiber is drawn and solidified.

The torsion in this case occurs due to elastic deformation.

That is, torsion in this case is elastic torsion which returns to the state before twisting when the external force is removed and accordingly the optical fiber returns to a free state (external force removal state).

In this case, using the optical fiber in an end product, such as a cable, finally in a state where the elastic torsion is held, that is, using the optical fiber in a state where the elastic torsion is held as an optical fiber used in the end product, such as a cable, is assumed.

Hereinafter, such elastic torsion may be called a "twist". As described above, the causes of the occurrence of PMD are largely divided into internal factors and external factors, and the method of giving an optical fiber a span (plastic torsion) which is disclosed in Japanese Unexamined Patent Application Publication No. H8-295528 and U.S. Pat. No. 6,324,872 is effective for PMD caused by the internal factors.

However, it is known that such a method of giving an optical fiber a span is not effective for suppressing a PMD increase caused by external factors (for example, refer to WO2009/107667).

On the other hand, the method of giving a twist (elastic torsion) as disclosed in WO2009/107667, Japanese Unexamined Patent Application Publication No. 2010-122666, and U.S. Pat. No. 7,317,855 is effective for suppressing PMD increase caused by external factors, such as lateral pressure or bending.

However, the above twist returns to the state before twisting due to elastic force when the external force is removed.

Here, the external force, such as frictional force, applied to an optical fiber may be removed or the external force, such as frictional force, may become significantly small, for example, in a coloring process, a process of arraying a plurality of optical fibers in a tape form, and an actual mass production process including the process of forming optical fiber cables and the inter-processes, which are all processes for making twisted optical fibers end products such as optical cables.

In above case, since the torsion is removed or the torsion becomes significantly small, the effect of suppressing a PMD increase caused by external factors disappears.

Therefore, there has been a problem in that it is difficult to reliably and stably suppress a PMD increase caused by external factors in end products such as cables.

As described above, in the related art, it has been difficult to reliably and stably suppress a PMD increase, which is caused by external factors such as anisotropic external forces as exemplified by lateral pressure or bending stress applied to optical fibers, in end products.

SUMMARY OF THE INVENTION

The invention has been made in view of the above situation, and it is an object of the invention to provide an optical fiber capable of reliably and stably suppressing a PMD increase caused by external factors such as anisotropic external forces as exemplified by lateral pressure or bending stress, in end products such as cables, and a method and apparatus for manufacturing the optical fiber.

The inventors conducted various kinds of experiments and analyses in order to solve the above-described problems.

As a result, the inventors found that elastic torsion was fixed (held) by cured coating resin by giving elastic torsion to a bare optical fiber until the coating resin was cured after the bare optical fiber was solidified when the bare optical fiber is coated with curable resin in a liquid state (non-cured), which was drawn from the optical fiber preform melted by heating, and curing the coating resin.

In addition, the inventors found that elastic torsion (twist) could be held when the above-described optical fiber was used in end products, such as optical cables, and this could suppress a PMD increases caused by external factors.

Here, the cured coating resin also has elasticity, and generally the Young's modulus of the cured coating resin is smaller than that of glass.

For this reason, even if elastic torsion is applied to the bare optical fiber after the bare optical fiber is solidified until the coating resin is cured as described above, it is difficult to fix the torsion by the coating resin as it is, that is, it is difficult to completely prevent an operation (untwisting), in which the elastic torsion returns to the state before twisting due to resilience, using the coating resin.

In addition, when the external force is removed after torsion is applied and the state changes to a free state, untwisting of a bare optical fiber portion to some extent cannot be avoided.

When the bare optical fiber portion is untwisted (restored to the state before being twisted), however, torsion in the return direction (direction in which the bare optical fiber portion is restored to the state before twisted) is applied to the coating resin layer commensurate with the untwisting of the bare optical fiber portion.

As a result, the untwisting of the bare optical fiber portion is stopped in a state where the elastic repulsive force of the coating resin against the torsion in the return direction applied to this coating resin layer and the return force of the torsion of the bare optical fiber portion (resilience of the elastic torsion trying to return to the state before twisting) are in balance.

Therefore, the elastic torsion of the bare optical fiber portion when the external force is removed after the torsion is applied is not eliminated 100%, and the torsion of the bare optical fiber portion is necessarily maintained at a certain level due to elastic repulsion of the coating resin.

Then, the torsion maintained in this way is held by the coating resin even in the external force removal state, and functions as elastic torsion (twist).

It was confirmed that typically at least approximately 20% to 30% of applied elastic torsion remained and was held by coating resin, as will be described later.

Accordingly, even if the external force is removed when making an end product through processes, such as a process of arraying a plurality of optical fibers in a tape form and a process of forming an optical fiber cable, the elastic torsion (twist) held and fixed by the coating resin in this way is reliably achieved. As a result, PMD increase caused by external factors can be stably and effectively suppressed.

According to a first aspect of the invention, an optical fiber includes: a bare optical fiber portion to which elastic torsion is applied; and a coating layer which coats the bare optical fiber portion, is formed of curable resin, and causes elastic repulsion against resilience occurring in the bare optical fiber portion so that the elastic torsion applied to the bare optical fiber portion is held.

By using the optical fiber described above, elastic torsion (twist) of the bare optical fiber portion is held by elastic repulsion of the coating layer against the force in the return (restoration) direction of the torsion. Accordingly, also in a state of an optical cable which is an end-use form, elastic torsion of the bare optical fiber portion can be reliably and stably held.

Therefore, it is possible to reliably and stably suppress a PMD increase caused by external factors.

Moreover, in the optical fiber according to the first aspect of the invention, preferably, first torsion and second torsion, the second torsion occurring in an opposite direction to a direction in which the first torsion occurs, are alternately applied to the bare optical fiber portion as elastic torsion applied to the bare optical fiber portion every predetermined length in a longitudinal direction of the optical fiber.

By using the optical fiber described above, the PMD increase caused by external factors when the first torsion and the second torsion, which occurs in the opposite direction to the direction in which the first torsion occurs, are alternately applied to the bare optical fiber portion as elastic torsion every applied length in the longitudinal direction of the bare optical fiber portion, can be suppressed more reliably and stably than that in the case where the elastic torsion is applied continuously in only one direction.

Moreover, in the optical fiber according to the first aspect of the invention, preferably, the coating layer is configured to include a first coating layer, the first coating layer formed of a resin with a relatively low Young's modulus, and a second coating layer, the second coating layer formed of a resin with a relatively high Young's modulus.

By using the optical fiber described above, it is possible to improve the adhesion of the coating layer to the bare optical fiber using resin with a low Young's modulus as the first coating layer being in contact with the peripheral surface of the bare optical fiber and also to increase elastic repulsion using resin with a high Young's modulus as the second coating layer located at the outer side.

Since this is advantageous in holding the elastic torsion (twist) of the bare optical fiber by the coating layer, the PMD increase caused by external factors can be suppressed more reliably and stably.

Moreover, in the optical fiber according to the first aspect of the invention, preferably, an inversion period T is in the range of 5 to 30 m in the longitudinal direction of the optical fiber and a maximum amplitude of an accumulated torsion angle of the bare optical fiber portion in an inverted torsion profile is $100 \times T$ (°) to $1200 \times T$ (°) under the condition where a remaining elastic torsion is applied to the bare optical fiber portion in a state where the elastic torsion applied to the bare optical fiber portion is held by the elastic repulsion caused by the coating layer.

By using the optical fiber described above, because the remaining the elastic torsion is sufficient amount by the inversion period T of the remaining elastic torsion being within the above range and the maximum amplitude of the accumulated torsion angle of the bare optical fiber portion being within the above range, a PMD increase caused by external factors can be reliably and stably suppressed.

In addition, according to a second aspect of the invention, there is provided a method for manufacturing the above-described optical fiber according to the first aspect of the invention.

That is, the optical fiber manufacturing method according to the second aspect of the invention includes: melting an optical fiber preform by heating; drawing a bare optical fiber with a predetermined diameter from the melted optical fiber preform; solidifying the drawn bare optical fiber; applying elastic torsion to the bare optical fiber after solidification by transmitting elastic torsion to the bare optical fiber toward an upstream side in a drawing direction of the bare optical fiber; forming a coating layer before curing by coating an outer periphery of the solidified bare optical fiber with curable resin in a liquid state; forming an optical fiber, to which torsion is applied so that the elastic torsion of the bare optical fiber is held, by curing the coating layer formed on the outer periphery of the bare optical fiber to which the elastic torsion is applied; and drawing the optical fiber to which the torsion is applied.

By using the optical fiber manufacturing method described above, it is possible to manufacture the optical fiber in which elastic torsion (twist) applied to the solidified bare optical fiber is held by the cured coating layer, that is, the optical fiber in which elastic torsion remains in the bare optical fiber even after the external force is removed.

Moreover, in the optical fiber manufacturing method according to the second aspect of the invention, preferably, a twisting device is used to apply torsion to the bare optical fiber, and torsion is applied to the bare optical fiber in a state where a member, the member preventing transmission of the torsion of the bare optical fiber, is not present at an upstream side of the twisting device.

When the optical fiber manufacturing method described above is used, torsion is smoothly transmitted from the twisting device to the upstream side of the twisting device. As a result, elastic torsion can be reliably and stably applied to the bare optical fiber.

Moreover, in the optical fiber manufacturing method according to the second aspect of the invention, it is preferable that when applying torsion to the optical fiber, a direction of the torsion applied to the bare optical fiber be periodically reversed.

By using the optical fiber manufacturing method described above, it is possible to obtain the optical fiber applied with torsion whose direction is periodically reversed. As a result, the PMD increase caused by external factors can be suppressed more effectively.

Moreover, in the optical fiber manufacturing method according to the second aspect of the invention, it is preferable that when the bare optical fiber is coated with curable resin, a viscosity of the liquid-state curable resin at the time of coating be 0.1 to 3 Pa·sec.

By using the optical fiber manufacturing method described above, the viscosity of the liquid-state resin at the time of coating becomes equal to or larger than 0.1 Pa·sec. Since this suppresses a change in the external diameter of a coat of an optical fiber, it is possible to obtain an optical fiber with a coat having a uniform external diameter.

In addition, the viscosity of the liquid-state resin at the time of coating is equal to or smaller than 3 Pa·sec, and this prevents the liquid-state resin from becoming resistant to the transmission of torsion. In particular, in the case of reversing the torsional direction periodically, the transmission of torsion and the direction of torsion can be reliably reversed.

Moreover, in the optical fiber manufacturing method according to the second aspect of the invention, preferably, an inversion period T of the torsion applied to the optical fiber in a longitudinal direction of the optical fiber is 5 to 30 m, and a maximum amplitude of an accumulated torsion angle in an inverted torsion profile is 500×T (°) to 4000×T (°).

When the optical fiber manufacturing method described above is used, the inversion period T of the torsion is within the above range and the maximum amplitude of the accumulated torsion angle is within the above range. Therefore, elastic torsion remaining when the external force on the optical fiber is removed can be sufficiently secured.

In addition, it is possible to prevent peeling or cracks of the coating layer caused by excessive stress.

Moreover, in the optical fiber manufacturing method according to the second aspect of the invention, preferably, an inversion period T is in the range of 5 to 30 m in the longitudinal direction of the optical fiber and a maximum amplitude of an accumulated torsion angle of the bare optical fiber portion in an inverted torsion profile is 100×T (°) to 1200×T (°) under the condition where a remaining elastic torsion is applied to the bare optical fiber portion in a state where the elastic torsion applied to the bare optical fiber portion is held by the elastic repulsion caused by the coating layer.

When the optical fiber manufacturing method described above is used, the inversion period T of the remaining elastic torsion is within the above range and the maximum amplitude of the accumulated torsion angle of the optical fiber portion is within the above range. Therefore, a PMD increase caused by external factors can be reliably and stably suppressed.

In addition, according to a third aspect of the invention, there is provided an apparatus for manufacturing the optical fiber according to the first aspect of the invention.

That is, the optical fiber manufacturing apparatus according to the third aspect of the invention includes: a heating furnace for drawing which heats and melts an optical fiber preform; a cooling device which forcibly cools a bare optical fiber, the bare optical fiber linearly drawn downward from the heating furnace for drawing, in order to solidify the bare optical fiber; a coating device which forms a coating layer by coating curable resin for protective coating on the cooled and solidified bare optical fiber; a coat curing device which cures non-cured coating layer coated by the coating device; and a twisting device which applies elastic torsion to the bare optical fiber after solidification by transmitting elastic torsion to the bare optical fiber toward an upstream side in a drawing direction of the bare optical fiber.

By using the optical fiber manufacturing apparatus described above, it is possible to manufacture the optical fiber in which elastic torsion (twist) applied to the solidified bare optical fiber is held by the cured coating layer, that is, the optical fiber in which elastic torsion remains in the bare optical fiber even after the external force is removed.

According to the optical fiber of the invention, even after the external force is removed, elastic torsion (twist) of the bare optical fiber is held by elastic repulsion of the coating layer against the force in the return (restoration) direction of the elastic torsion.

For this reason, also in a state of an optical cable which is an end-use form, elastic torsion of the bare optical fiber portion can be reliably and stably held.

As a result, a PMD increase caused by external factors, such as bending or lateral pressure, can be reliably and stably suppressed.

In addition, according to the optical fiber manufacturing method and the optical fiber manufacturing apparatus of the invention, it is possible to reliably and easily manufacture the optical fiber capable of reliably and stably suppressing the PMD increase caused by external factors, such as bending or lateral pressure, as described above.

DETAILED DESCRIPTION OF THE INVENTION

Hereinafter, each embodiment of the invention will be described in detail with reference to the accompanying drawings.

Figure 1:
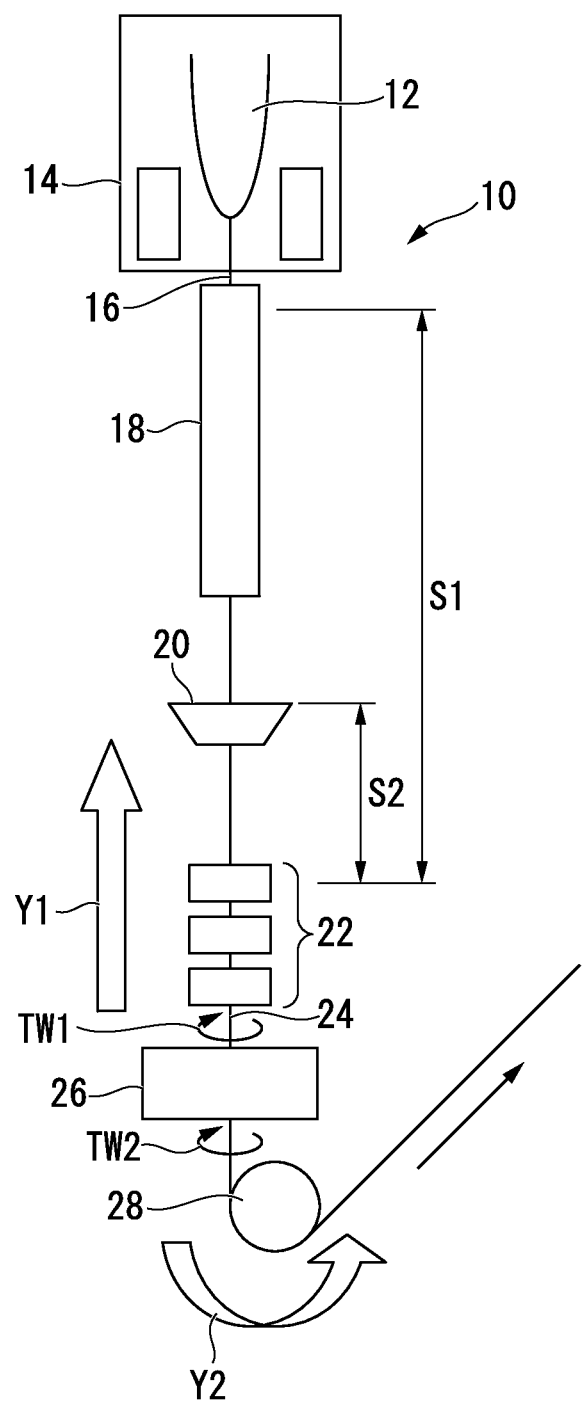
FIG. 1 is a schematic exploded view showing the entire configuration of an example of an apparatus for manufacturing an optical fiber of the invention.

FIG. 1 shows an example of an apparatus for manufacturing an optical fiber of the invention.

In FIG. 1, an optical fiber manufacturing apparatus 10 includes: a heating furnace for drawing 14 which heats and melts an optical fiber preform 12 formed of silica based glass, for example; a cooling device 18 which forcibly cools a bare optical fiber 16, which is linearly drawn downward from the heating furnace for drawing 14, in order to solidify the bare optical fiber 16; a coating device 20 which coats the cooled and solidified bare optical fiber 16 with curable resin for protective coating, such as ultraviolet curable resin or thermosetting resin; a coat curing device 22 which cures the curable resin, which has been coated by the coating device 20 and which has not yet been cured (which is in a liquid state), by ultraviolet irradiation or heating; a twisting device 26 which applies an optical fiber 24 a twist in a state where the curable resin for protective coating is cured; a pickup device which picks up the twisted optical fiber 24 through a guide pulley 28 or a dancer roller (not shown); and a winding device (not shown) which finally winds the optical fiber.

Here, although the twisting device 26 may be configured to continuously apply the optical fiber 24 a twist in a fixed direction, it is typically desirable to configure the twisting device 26 such that the torsional direction (clockwise direction or counterclockwise direction) is reversed periodically, as will be described again later.

Figure 2A:
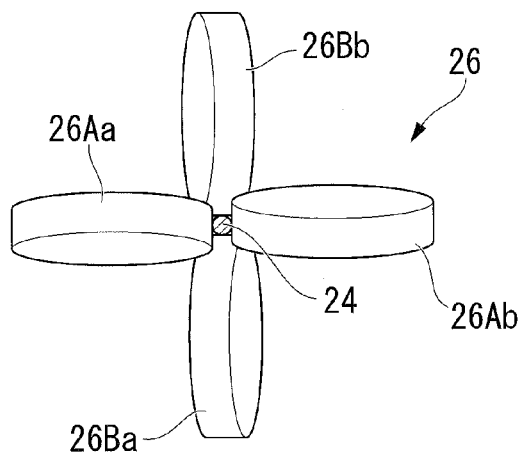
FIG. 2A is a plan view showing an example of a twisting device, which is used in the apparatus for manufacturing an optical fiber of the invention, when the twisting device is seen from above.
Figure 2B:
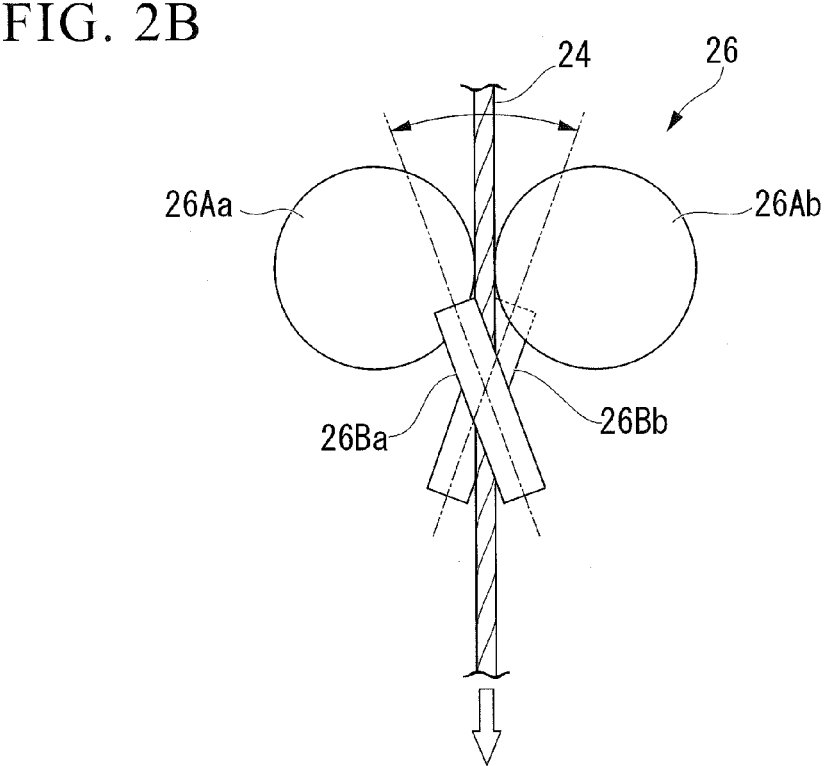
FIG. 2B is a front view of a twisting device, which shows an example of the twisting device used in the apparatus for manufacturing an optical fiber of the invention.
Figure 3:
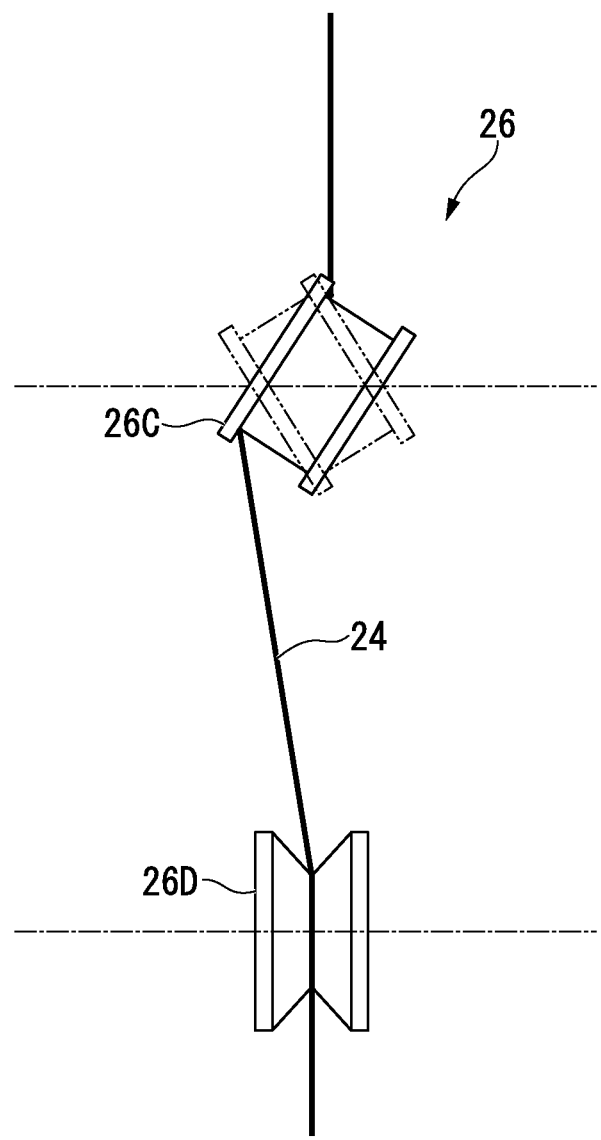
FIG. 3 is a front view showing another example of the twisting device used in the apparatus for manufacturing an optical fiber of the invention.

Although the specific configuration of the twisting device 26 is not limited in particular, it is preferable to apply a twisting device shown in FIG. 2 (the same device as the twisting device shown in FIG. 11 of Japanese Unexamined Patent Application Publication No. 2010-122666) or a twisting device shown in FIG. 3 (the same device as the twisting device shown in FIG. 2 of Japanese Unexamined Patent Application Publication No. H8-295528 or FIG. 10 of Japanese Unexamined Patent Application Publication No. 2010-122666), for example.

The twisting device 26 shown in FIG. 2 is formed by two twisting roller pairs 26Aa and 26Ab and 26Ba and 26Bb, each pair of twisting rollers rotating with the optical fiber 24 interposed between both the sides.

The second pair of twisting rollers 26Ba and 26Bb are provided at the positions near the first pair of twisting rollers 26Aa and 26Ab at the downstream side of the first pair of twisting rollers 26Aa and 26Ab (side at which the guide pulley 28 in FIG. 1 is provided).

In addition, the second pair of twisting rollers 26Ba and 26Bb are disposed so as to be shifted by 90° from the first pair of twisting rollers 26Aa and 26Ab with the center on a cross section, which is perpendicular to the longitudinal direction (fiber drawing direction) of the optical fiber 24, as the axis.

Then, when each of the twisting roller pairs 26Aa and 26Ab and 26Ba and 26Bb rotate with the optical fiber 24 interposed between both the sides, the rotary axis of each of the twisting roller pairs 26Aa and 26Ab and 26Ba and 26Bb is inclined by a predetermined small angle in a direction perpendicular to the longitudinal direction of the optical fiber 24, so that the optical fiber 24 can be twisted.

Then, the inclination direction of each of the twisting roller pairs 26Aa and 26Ab and 26Ba and 26Bb with respect to the optical fiber 24 is changed to the opposite direction, so that the direction of torsion applied to the optical fiber 24 can be changed.

In addition, the twisting device 26 shown in FIG. 3 includes a twisting roller 26C, which has the optical fiber 24 wound on its outer periphery and which rotates around the rotary axis inclined with respect to the fiber drawing direction, and a fixed position roller 26D, which is disposed at the downstream side of the twisting roller 26C and which rotates around the rotary axis perpendicular to the fiber drawing direction.

In addition, the optical fiber 24 rolls on the outer periphery of the twisting roller 26C along the rotary axis direction so that the optical fiber 24 is twisted, and the torsional direction can be reversed by performing swinging so that the inclination direction of the twisting roller 26C is reversed.

In addition, it is preferable to provide the twisting device 26 at the position where the torsion can be applied after coating the cooled and solidified bare optical fiber 16 with curable resin for protective coating and curing the curable resin.

However, at the upstream side of the twisting device 26, it is not preferable to provide a mechanism or a member which prevents transmission of torsion in contact with the optical fiber 24 or the bare optical fiber 16.

Then, in the optical fiber manufacturing apparatus shown in FIG. 1, the twisting device 26 is disposed between the coat curing device 22 and the guide roller 28 so that the above-described conditions are satisfied.

In this case, at the upstream side of the twisting device 26, there is no member contacting physically the surface of the optical fiber 24 or the bare optical fiber 16 except for curable coating resin.

Therefore, it becomes possible to apply elastic torsion (twist), which is an object of the invention, by transmitting the torsion applied by the twisting device 26 continuously and smoothly to the upstream side.

However, in the case of a member for which the rolling of an optical fiber is permitted, such as a flat groove pulley with a certain amount of groove width, a possibility that the member will prevent the transmission of torsion is low even if the member is in contact with the optical fiber. Accordingly, such a member may be provided at the upstream side of the twisting device 26.

In addition, although the curable resin coated by the coating device 20 may has one layer, a two-layer structure of a first coating layer (primary material) and a second coating layer (secondary material) is generally used in many cases. Therefore, also in the invention, it is desirable to form a resin coating layer with a two-layer structure.

That is, as the first coating layer, it is preferable to use ultraviolet curable resin, such as epoxy acrylate resin or urethane acrylate resin, or to use thermosetting resin, such as silicon resin, with a low Young's modulus after curing of approximately 5 MPa or less (generally, the Young's modulus in room temperature is 0.3 to 1.5 MPa).

On the other hand, as the second coating layer, it is preferable to use ultraviolet curable resin, such as epoxy acrylate resin or urethane acrylate resin, or to use thermosetting resin, such as modified silicon resin, with a high Young's modulus after curing of approximately 100 MPa or more (generally, the Young's modulus in room temperature is 300 to 1500 MPa).

Since a material with a low Young's modulus is used as the first coating layer as described above, it is possible to show the good cushion effect for a bare optical fiber and to improve the adhesion of the coating layer to the bare optical fiber.

In addition, since a material with a high Young's modulus is used as the second coating layer, the curable resin can sufficiently withstand external damage, friction, lateral pressure, and the like.

In particular, in the case of the optical fiber of the invention, increasing the apparent Young's modulus of the entire coating layer while improving the adhesion to a bare optical fiber portion is advantageous in holding elastic torsion (twist) of the bare optical fiber portion with the coating layer.

Therefore, also from this point of view, it is desirable to form a coating layer with a two-layer structure in which two layers have different Young's moduli after curing.

In addition, as a coating method and a curing method when forming a coating layer with such a two-layer structure, it is possible to provide each of the coating device 20 and the coat curing device 22 in only one place, perform two-layer coating using one coating device 20, and cure the obtained two-layer coating layer collectively using three coat curing devices 22, as shown in FIG. 1.

Figure 8:
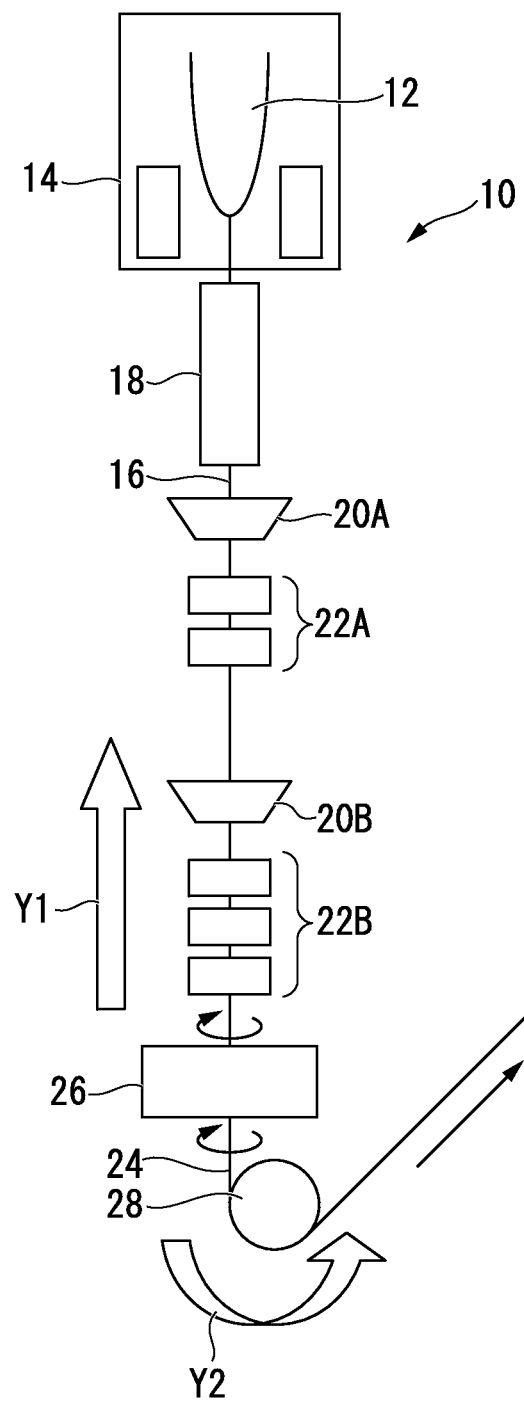
FIG. 8 is a schematic exploded view showing the entire configuration of another example of the apparatus for manufacturing an optical fiber of the invention.

Alternatively, as shown in FIG. 8 described later, it is also possible to provide each of the coating device 20 and the coat curing device 22 in two places, apply a first coat of resin as the first coating layer and cure the resin, and then apply a second coat if resin as the second coating layer and cure the resin.

In addition, although the viscosity of the resin in a liquid state when applying a coat of the curable resin on a bare optical fiber is also a factor which affects the situation of elastic torsion (twist) application and the like, an explanation thereof will be applied later.

Next, a method of manufacturing an optical fiber, to which the elastic torsion (twist) of the invention is applied, using the above optical fiber manufacturing apparatus will be described.

When manufacturing an optical fiber using the above-described optical fiber manufacturing apparatus, the optical fiber preform 12, such as a silica based glass preform which is a raw material of a bare optical fiber, is heated at high temperature of 2000° C. or more in the heating furnace for drawing 14 so as to melt, the melted preform is pulled out downward from the lower portion of the heating furnace for drawing 14 while extending it as the bare optical fiber 16 in a high temperature state, and the bare optical fiber 16 is solidified by cooling of the cooling device 18.

On the bare optical fiber 16 solidified by cooling up to proper temperature using the cooling device 18, two kinds of curable resin including ultraviolet curable resin and thermosetting resin are coated as first and second coating layers in a liquid state by the coating device 20 for two-layer coating, for example.

Then, the obtained coating resin is cured by the coat curing device 22 using an appropriate curing method according to the resin type, such as ultraviolet curable resin or thermosetting resin. As a result, the optical fiber 24 including two coating layers is obtained.

In addition, predetermined torsion TW1 and TW2 is applied to the obtained optical fiber 24 by the twisting device 26 shown in FIG. 2 or FIG. 3, for example. Then, the optical fiber 24 is picked up at predetermined speed by a pickup device (not shown) through the guide pulley 28 and is wound by a winding device (not shown).

In the apparatus shown in FIG. 1, the torsion TW1 and TW2 applied to the optical fiber 24 by the twisting device 26 is transmitted before and after the twisting device 26 (upstream and downstream sides of the twisting device 26), as shown by the arrows Y1 and Y2 in FIG. 1. However, the torsion TW1 transmitted to the optical fiber preform side (upstream side) is focused in particular herein.

In this case, the torsion TW1 passes the coating device 20 through the coat curing device 22 and is then transmitted toward the upper cooling device 18.

Accordingly, the bare optical fiber 16 is solidified by the cooling device 18, and then non-cured (liquid-state) curable resin is coated on the outer periphery of the bare optical fiber by the coating device 20 and torsion is applied until the coating resin is cured by the coat curing device 22 (near a region indicated by the reference numeral S1 in FIG. 1).

Here, the torsion applied after the bare optical fiber is solidified is torsion which returns to the state before twisting when the external force is removed, that is, elastic torsion (twist).

In addition, the torsion applied to the optical fiber 24 by the twisting device 26 after the coating resin is cured is also applied undoubtedly to the coating layer united with the bare optical fiber portion.

On the other hand, until the resin is cured (near the region S2 in FIG. 1) after the resin is coated in a liquid state by the coating device 20, the coating resin may flow. Accordingly, the coating resin does not show its elastic behavior during this period.

Therefore, in the region S2, elastic torsion is not substantially applied to the coating layer.

Then, when the resin coated in a liquid state on the outer periphery of the bare optical fiber is cured, the elastic torsion (twist) of the bare optical fiber applied until then is fixed (held) by the resin of the coating layer.

Figure 4:
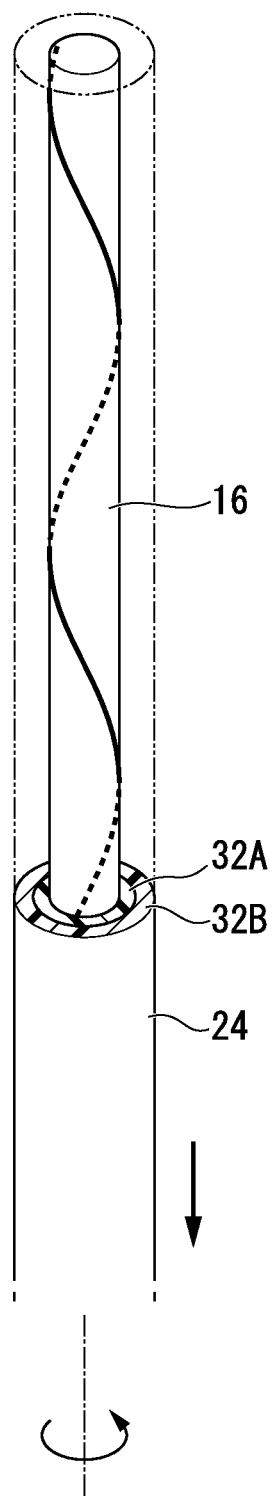
FIG. 4 is a perspective view schematically showing a situation of an example of an optical fiber immediately after curing of a coating layer in the optical fiber manufacturing process of the invention, and is a view for explaining the internal structure of the optical fiber.

Here, FIG. 4 schematically shows an example of the optical fiber 24 in a stage where a coating layer is cured by the coat curing device 22 in the manufacturing process of the optical fiber 24 manufactured by the above-described apparatus in FIG. 1.

In FIG. 4, reference numerals 32A and 32B indicate first and second coating layers of the coating layer, respectively. In addition, a thick solid line and a thick dotted line drawn on the outer periphery of the bare optical fiber 16 in FIG. 4 indicate applied torsion.

This drawing shows a state where clockwise torsion is applied seen from the downstream side in the manufacturing process of the optical fiber and accordingly, clockwise torsion is applied to a portion of the bare optical fiber 16 seen from the lower side.

As already described, the coating layers 32A and 32B do not show their elastic behaviors until they are cured after being coated in a liquid state on the outer periphery of the bare optical fiber 16.

Accordingly, in the stage shown in FIG. 4, torsion is not substantially applied to the coating layers 32A and 32B.

As will be described later, an optical fiber in a stage where the external force, such as friction, is not removed is shown in FIG. 4.

In addition, until the optical fiber reaches the twisting device 26 after the coating layer is cured by the coat curing device 22, torsion is applied to the optical fiber. Moreover, also at the downstream side of the twisting device 26, torsion is applied to the optical fiber. However, this torsion applied after curing of the coating layer is elastic torsion applied entirely to both the bare optical fiber portion and the coating layer.

Accordingly, if the external force, such as friction, applied to the optical fiber, is removed, torsion applied after curing of the coating layer is removed. For this reason, this is not a reliable factor for acquiring the effect of suppressing a PMD increase caused by the external factors.

Therefore, since it does not contribute to solving the problem of the invention, a detailed explanation thereof will be omitted herein.

Meanwhile, the cured coating resin is softer than the bare optical fiber portion and has low rigidity. Accordingly, even if elastic torsion is applied to the optical fiber until the coating resin is cured after the bare optical fiber is solidified as described above, it is difficult to completely fix the applied elastic torsion by the coating resin as it is, that is, it is difficult to completely prevent untwisting (restoration) caused by the elastic force when the external force is removed.

That is, if the external force, such as a frictional force, is removed from the twisted optical fiber subsequently, the resin coating layer is twisted in a return direction of the bare optical fiber portion by the elastic return force of the bare optical fiber portion inside the optical fiber. Accordingly, the elastic torsion of the bare fiber portion also inevitably returns to the state before twisting to some extent.

However, since the cured coating resin also has elasticity, torsion in the return direction which is applied to the coating resin layer when the bare optical fiber portion is untwisted also serves as elastic torsion. Accordingly, untwisting of the bare optical fiber portion is stopped when the repulsive force against the elastic torsion of the coating resin layer and the untwisting force of the bare optical fiber portion (resilience of the elastic torsion trying to return to the state before twisting) are in balance.

Therefore, the elastic torsion applied to the bare optical fiber portion when the external force is removed is not eliminated 100%, and the elastic torsion applied to the bare optical fiber portion is necessarily left at a certain rate due to elastic repulsion of the coating resin.

The torsion left in this way is held and fixed by the coating resin and also functions as elastic torsion (twist) in end products.

Figure 5:
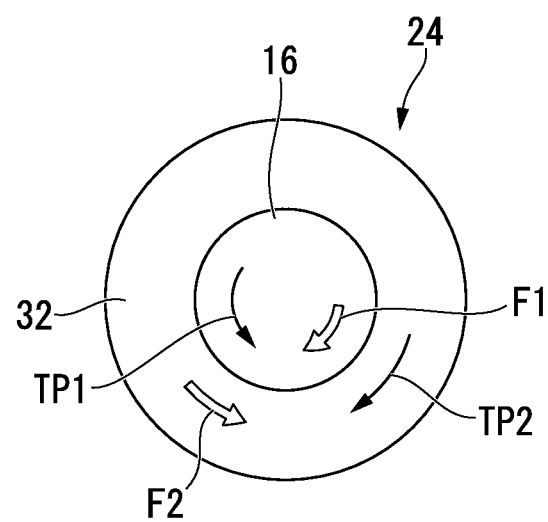
FIG. 5 is a schematic sectional view of an optical fiber, which schematically shows a situation when the external force on the optical fiber of the invention is removed.

FIG. 5 schematically shows the relationship between the torsion and the balance of the force when the external force, such as friction, applied to an optical fiber, is removed as described above.

Figure 6A:
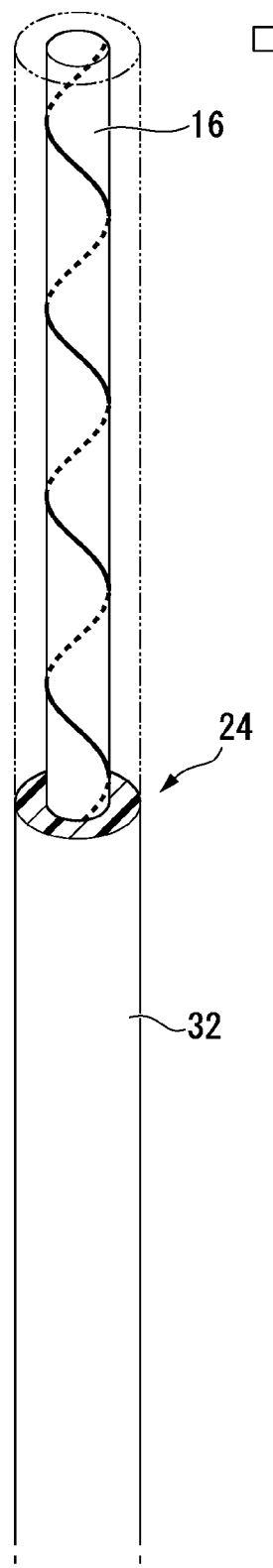
FIG. 6A is a perspective view showing a state immediately after a coating layer of the optical fiber shown in FIG. 4 is cured, and is a view for explaining the internal structure of the optical fiber.
Figure 6B:
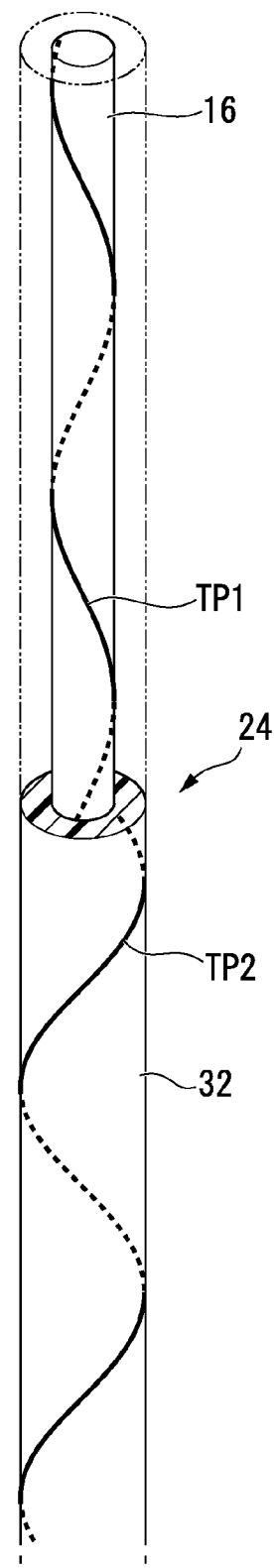
FIG. 6B is a perspective view showing a state after the external force applied to the optical fiber shown in FIG. 4 is removed, and is a view for explaining the internal structure of the optical fiber.

In addition, FIG. 6B schematically shows a situation of the torsion of an optical fiber in a free state after the external force, such as friction, applied to the optical fiber, is removed (state where no external force is applied to the optical fiber).

In addition, a torsion situation immediately after a coating layer is cured is shown in FIG. 6A for the sake of comparison (substantially the same as FIG. 4).

In FIGS. 6A and 6B, a thick solid line and a thick dotted line indicate a torsion situation.

In FIGS. 5, 6A, and 6B, a case of a coating layer of one layer (reference numeral 32) is shown for the sake of simplicity.

In FIG. 5, for example, a counterclockwise elastic torsion TP1 is applied to a portion of the bare optical fiber 16 until the external force applied to the optical fiber is removed.

On the other hand, when the external force is removed to reach a free state, an elastic return force F1 works clockwise to reduce the counterclockwise elastic torsion TP1.

This means that the bare optical fiber 16 is twisted clockwise when the external force is removed.

Accordingly, the coating layer 32 that adheres to the bare optical fiber 16 is also twisted clockwise (torsion TP2).

In this case, since the coating layer 32 also has elasticity, an elastic repulsive force F2 is generated in the opposite direction (counterclockwise direction) to the clockwise torsion TP2.

Then, the elastic torsion TP1 of the portion of the bare optical fiber 16 is held in a state where the counterclockwise elastic repulsive force F2 of the coating layer 32 and the clockwise elastic repulsive force F1 of the above-described bare optical fiber 16 are in balance.

Accordingly, in the optical fiber in a free state after the external force, such as friction, applied to the optical fiber, is removed, the torsion TP1 and TP2 in opposite directions remains in the portion of the bare optical fiber 16 and the portion of the coating layer 32, as shown in FIG. 6B. The torsion TP1 remaining in the portion of the bare optical fiber 16 is smaller than the torsion immediately after curing of the coating layer (thick solid line and dotted line in FIG. 6A).

Here, the Young's modulus of the cured coating resin is generally quite low compared with that of optical fiber glass, but is not zero.

Therefore, when the external force is removed, elastic repulsive force by the torsion of the resin coating layer caused by untwisting of the bare optical fiber portion is necessarily generated. As a result, elastic torsion of the bare optical fiber portion remains in a state where the repulsive forces are in balance as described above.

In a coating layer with a two-layer structure which is used in a typical optical fiber, a material whose Young's modulus at room temperature is approximately 0.3 to 1.5 MPa is used as a resin (primary material) of the first coating layer and a material whose Young's modulus at room temperature is approximately 300 to 1500 MPa is used as a resin (secondary material) of the second coating layer.

In addition, the diameter of the bare optical fiber is approximately 125 μm. Of the external diameters of the coating layer, the external diameter of the first coating layer (primary layer) is approximately 170 to 210 μm and the external diameter of the second coating layer (secondary layer) is approximately 230 to 260 μm.

In addition, elastic torsion was applied to such an optical fiber as described above, and then the external force applied to the optical fiber was removed to check the remaining torsion of the bare optical fiber. As a result, it was confirmed that approximately 20 to 30% of elastic torsion of the torsion applied to the optical fiber remained.

In addition, although the torsion may be continuously applied to an optical fiber in one direction by the twisting device, reversing the torsional direction to clockwise direction and counterclockwise direction periodically as described above, that is, giving alternately first torsion and second torsion, which occurs in the opposite direction to a direction in which the first torsion occurs, every applied length in the longitudinal direction of the optical fiber is more effective for suppressing a PMD increase caused by the external factors.

In the case of reversing the torsional direction periodically as described above, it is preferable that the viscosity of the coating resin in a liquid state at the time of coating using a coating device be set within the range of 0.1 to 3 Pa·sec including each coating layer of the two-layer coat.

When the viscosity of the resin in a liquid state at the time of coating is less than 0.1 Pa·sec, it is difficult to coat the resin uniformly in order to obtain the coating layer with a uniform thickness since the viscosity is too low.

In this case, since the amount of change in the external diameter of the coat of the optical fiber exceeds ±2 µm, a defective optical fiber may be produced.

On the other hand, when the viscosity of the resin in a liquid state at the time of coating exceeds 3 Pa·sec, the viscosity of the coating resin acts as a resistance against the transmission of the torsion in the bare optical fiber from the twisting device to the upstream side of twisting device.

As a result, since a phenomenon in which torsion is accumulated between the twisting device and the coating device becomes noticeable, the transmission of the torsion between the coat curing device and the coating device also tends to become slow.

In this case, before the torsion in a certain direction (for example, clockwise direction) is reliably held by the coating layer between the coat curing device and the coating device, the torsion in the opposite direction (for example, counterclockwise direction) is applied, so that the clockwise torsion returns to the state before twisting.

As a result, the amount of torsion remaining after curing of the coating layer may be reduced or the torsion may disappear almost completely.

Therefore, when reversing the torsional direction periodically, it is preferable to adjust the viscosity of the resin in a liquid state at the time of coating within the above-described appropriate range.

In addition, when reversing the torsional direction periodically as described above, an angle of torsion (or the accumulated torsion angle) with respect to the longitudinal distance of the optical fiber can be drawn as an inverted torsion profile.

Moreover, in general, the waveform of the inverted torsion profile is preferably a sine wave. However, the waveform of the inverted torsion profile may be a triangular wave or a trapezoidal wave and it is not limited in particular.

Figure 7:
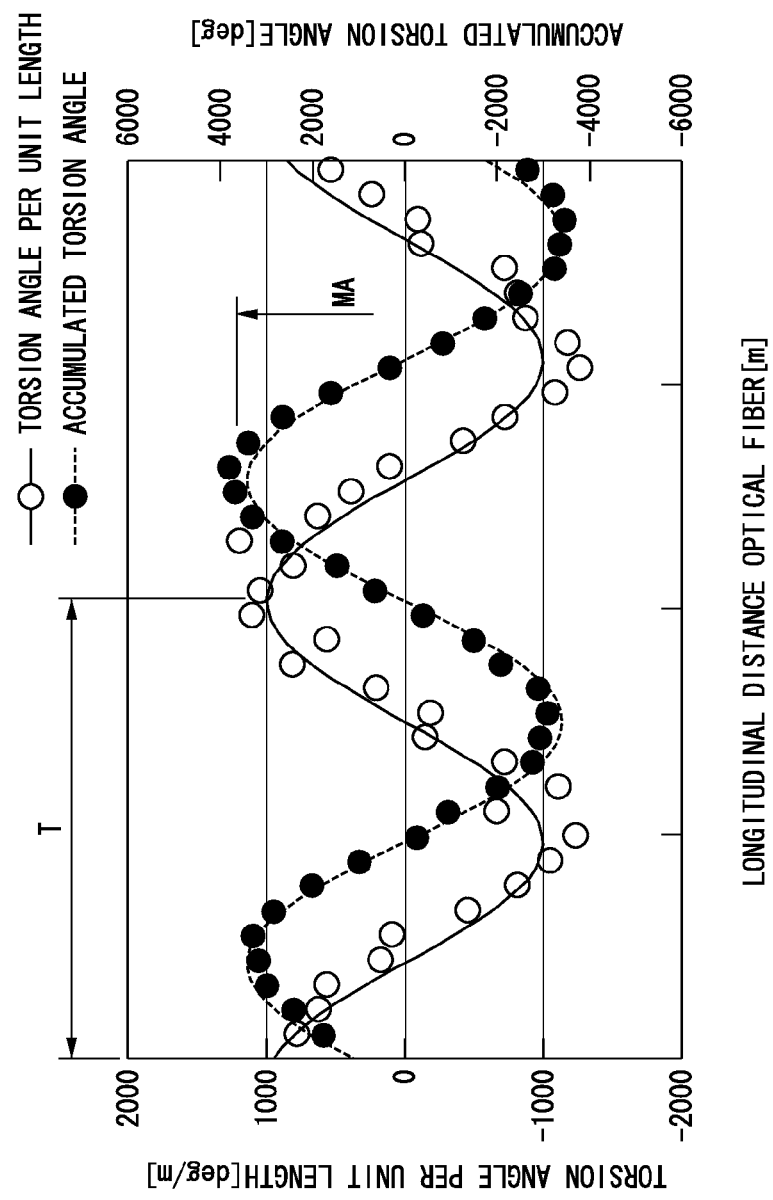
FIG. 7 is a graph showing an example of the profile of inverted torsion in the optical fiber manufacturing method of the invention.

An example of the inverted torsion profile when adopting the sine wave is shown in FIG. 7.

In FIG. 7, a solid line indicates a transition of an angle of torsion (torsion angle per unit length) with respect to the longitudinal distance of an optical fiber, and a dotted line indicates a transition of an angle of accumulated torsion with respect to the longitudinal distance of the optical fiber.

Here, in the inverted torsion profile, it is preferable that a twist inversion period (length on an optical fiber after torsion in a certain direction, for example, in the clockwise direction starts to apply a twist in the clockwise direction and then a torsional direction is reversed to apply a twist in the counterclockwise direction and the counterclockwise torsion ends) T be set within a range of 5 to 30 m.

When the twist inversion period T is less than 5 m, the clockwise torsion and the counterclockwise torsion are easy to be offset while the torsion is being transmitted.

On the other hand, when the twist inversion period T exceeds 30 m, there is a possibility that the effect of suppressing a PMD increase caused by the external factors will no longer be acquired if larger torsion is not applied.

Moreover, in the inverted torsion profile, it is preferable that the maximum amplitude MA (refer to FIG. 7) of the accumulated torsion angle be set within a range of 500×T to 4000×T (°).

When the maximum amplitude MA of the accumulated torsion angle is less than 500×T (°), elastic torsion of a bare optical fiber portion which remains after the external force on the optical fiber is removed is decreased. As a result, the effect of suppressing a PMD increase caused by the external factors is reduced.

On the other hand, when the maximum amplitude MA of the accumulated torsion angle exceeds 4000×T (°), the stress applied from the bare optical fiber portion to the coating layer when the external force on the optical fiber is removed is too large. As a result, peeling may occur between the bare optical fiber portion and the coating layer, or cracks may occur in the coating layer.

Furthermore, in the inverted torsion profile, it is desirable that an inversion period T be in the range of 5 to 30 m in the longitudinal direction of the optical fiber, under the condition where a remaining elastic torsion is applied to the bare optical fiber portion in a state where the elastic torsion applied to the bare optical fiber portion is held by the elastic repulsion caused by the coating layer. Additionally it is desirable that the maximum amplitude of an accumulated torsion angle of the bare optical fiber portion in an inverted torsion profile be is 100×T (°) to 1200×T (°) under the above condition.

Because the remaining the elastic torsion is sufficient by the inversion period T of the remaining elastic torsion being within the above range and the maximum amplitude of the accumulated torsion angle of the bare optical fiber portion being within the above range, a PMD increase caused by external factors can be reliably and stably suppressed.

FIG. 8 shows another embodiment of the apparatus for manufacturing an optical fiber of the invention.

The optical fiber manufacturing apparatus shown in FIG. 8 has a configuration in which each of a coating device and a coat curing device are provided at two places in order to manufacture an optical fiber having a coating layer with a two-layer structure.

That is, a primary coating device 20A is provided immediately below the cooling device 18, which cools and solidifies the bare optical fiber 16 drawn from the heating furnace for drawing 14, and a primary coat curing device 22A is provided at the downstream side of the primary coating device 20A in order to coat and cure a first coating layer first.

In addition, a secondary coating device 20B and a secondary coat curing device 22B are provided in order of 20B and 22B at the downstream side of the primary coat curing device in order to coat and cure a second coating layer on the first coating layer.

Then, torsion is applied at the downstream side of the secondary coat curing device 22B by the twisting device 26.

Also when coating and curing the coat layers at two separate places as described above in manufacturing the optical fiber having a coating layer with a two-layer structure, twisting, torsion holding, and remaining torsion are the same as those in the case described on the basis of FIG. 1. In addition, the desired conditions are also the same as those described above.

Hereinafter, examples of the invention will be described together with comparative examples.

In addition, the following examples are examples for clarifying the operations and effects of the invention, and the technical scope of the invention is not limited by the conditions described in these examples.

Hereinafter, a method of measuring elastic torsion (twist) angle in the invention will be described.

The first step is to obtain approximately 1 m of an optical fiber which is manufactured by the above method as a sample.

The next step is to fix one end of the obtained sample, and suspend the sample in a vertical direction.

The next step is to secure a clip to the other end of the sample which is opposite end of the fixed end, and fix the clip while removing the torsion from the suspended sample.

The next step is to remove 1 m of a coating layer provided on the sample.

The next step is to release the fixed clip, and measure the rotating angle of the clip which is the angle of the position of the clip from in the fixed state to the position of the clip in the released state.

The measured rotating angle of the 1 m section by above-shown method is the elastic torsion angle per unit length.

Furthermore, measuring elastic torsion angle of other optical fibers can be measured by repeating above method.

FIRST EXAMPLE

Using the optical fiber manufacturing apparatus shown in FIG. 1 and using the device shown in FIG. 3 as a twisting device in the manufacturing apparatus, an optical fiber to which elastic torsion (twist) was applied to a silica glass based optical fiber with a two-layer coat structure, which had characteristics of a typical single-mode fiber, according to the above-described method of the invention was manufactured.

The drawing speed (fiber drawing speed) from the optical fiber preform was set to 2000 mm/min.

In addition, a two-layer simultaneous coating method (wet on wet method) for coating two kinds of coating resin at one place was applied by the coating device.

UV curable urethane acrylate based resin (Young's modulus at the time of curing was 0.5 MPa) was used as a resin (primary material) of the first coating layer, and UV curable urethane acrylate based resin (Young's modulus at the time of curing was 1000 MPa) was used as a resin (secondary material) of the second coating layer.

In addition, the viscosity of a liquid resin at the time of coating of both the above materials was adjusted to 1 Pa·sec, and the liquid resin was coated by the coating device and then cured by a UV lamp which was the coat curing device.

Torsion was applied immediately after the process of curing the coating resin by the coat curing device.

In addition, at the upstream side of the twisting device, fiber drawing was performed in a state where there was no physical contact with an optical fiber except for the coating resin.

Here, the profile of torsion in a longitudinal direction of an optical fiber, which was applied to the optical fiber by the twisting device, was a sine wave which had a periodically reversed torsional direction, and the swing angle and the swing speed of the twisting device were set such that the period T became 20 m and the maximum amplitude MA of the accumulated torsion angle became 10000°.

The optical fiber after passing the twisting device was picked up through a guide pulley by a pickup device and was wound through a dancer pulley by a winding device. As a result, an optical fiber in which elastic torsion (twist) was applied to a bare optical fiber portion was obtained.

In addition, in the obtained optical fiber, the diameter of the bare optical fiber was 125 μm, the primary diameter of the external diameter of the coat (external diameter of the first coating layer) was 200 μm, and the secondary diameter (external diameter of the second coating layer) was 250 μm.

A sample was manufactured by rewinding the optical fibers in the first example, which were manufactured and wound as described above, using a rewinding device while securing a distance (free length) of 30 m so as not to be in contact with a member to which the external force such as frictional resistance was applied, such as a pulley, so that the torsion applied to the optical fibers was removed.

For the manufactured sample, lateral pressure was intentionally applied to optical fibers by winding a sample, which had a length of 1000 m, forcibly around a 400 mmϕ steel bobbin with a winding tension of 200 gf and with one layer so that the fibers did not overlap each other.

That is, the conditions where a PMD was likely to occur due to external factors were set.

Then, a PMD measurement was executed after the sample was left for 1 hour or more for stabilization of fiber temperature.

For a PMD measurement, the HP8509B measuring instrument made by Hewlett Packard was used and the JME method (Jones Matrix Eigenanalysis method) was used.

The measured wavelength was 1510 to 1600 nm, and a scan was performed at 2 nm step.

As a result, 0.05 ps/√km which was a very small value was acquired as a PMD value (PMD1) when the lateral pressure was applied.

On the other hand, a PMD was measured again for the same optical fiber as the optical fiber used in the above sample under the same conditions as described above when the optical fiber was in a free coil state (when the lateral pressure was removed). As a result, a PMD value (PMD2) in the free coil state was 0.02 ps/√km.

Here, the difference (0.03 ps/√km) between PMD1 and PMD2 can be regarded as a PMD increase caused by lateral pressure application, that is, a PMD increase caused by the external factors.

Furthermore, when removing the coating layer of the optical fiber and measuring the amount of a remaining torsion, an inversion period T of the remaining elastic torsion was 20 m and the maximum amplitude of an accumulated torsion angle was 3000°.

The reason why a PMD increase at the time of application of the lateral pressure (external factors) is noticeably small as described above may be understood as follows. That is, since the torsion applied during the optical fiber manufacturing process was held at the considerable rate by the coating layer and remained as elastic torsion (twist) even after reaching the free state (external force removal state) by the above-described rewinding, a PMD increase at the time of application of the lateral pressure (external factors) could be suppressed by the remaining elastic torsion.

FIRST COMPARATIVE EXAMPLE

An optical fiber was manufactured using the same method as in the first example except that elastic torsion (twist) was not applied.

In addition, a PMD value in each of the state where the lateral pressure was intentionally applied and the free coil state where the lateral pressure was removed was measured in the same manner as in the first example.

As a result, a PMD value (PMD1) in the state where the lateral pressure was applied was 0.62 ps/√km which was a significantly high value.

In addition, a PMD value (PMD2) in the state where the lateral pressure was removed (free coil state) was 0.02 ps/√km as in the first example.

The difference between PMD1 and PMD2 in this case, that is, a PMD increase caused by the external factor of lateral pressure application, was 0.60 ps/√km which was a large value.

If the first example where the elastic torsion is applied as described above is compared with the first comparative example where no elastic torsion is applied as described above, PMD1 at the time of application of the lateral pressure in the first example is much smaller than that in the first comparative example, and the difference between PMD1 and PMD2 (PMD increase caused by application of the lateral pressure) in the first example is also much smaller than that in the first comparative example.

From this, it is apparent that a PMD increase caused by the external factors became large since the elastic torsion was not applied in the first comparative example, while a PMD increase caused by the external factors could be suppressed to be a very small amount since the elastic torsion was applied as described above so that the elastic torsion could be held even after the external force (lateral pressure) was removed in the first example.

SECOND COMPARATIVE EXAMPLE

Figure 9:
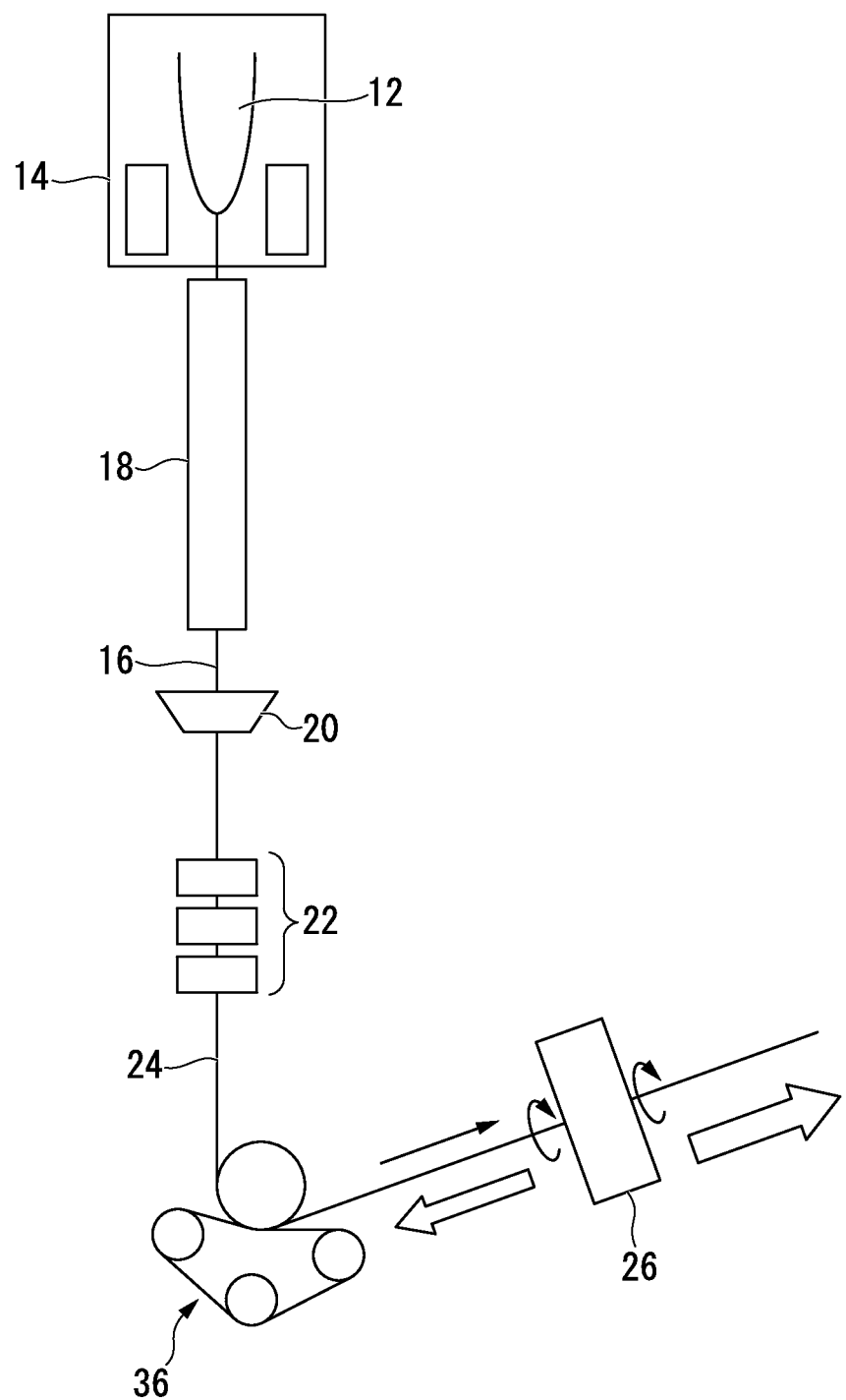
FIG. 9 is a schematic exploded view showing an optical fiber manufacturing apparatus used in a second comparative example.

As shown in FIG. 9, the twisting device 26 was provided at the downstream side of a pickup capstan 36, so that the torsion was applied to the optical fiber 24 after passing the pickup capstan 36.

The other configuration is the same as that in the first example.

A sample was manufactured by rewinding the manufactured optical fiber in the same manner as in the first example to remove the torsion applied to the optical fiber.

For the manufactured sample, a PMD value in each of the state where the lateral pressure was intentionally applied and the free coil state where the lateral pressure was removed was measured in the same manner as in the first example.

As a result, a PMD value (PMD1) in the state where the lateral pressure was applied was 0.58 ps/√km which was a significantly high value.

In addition, a PMD value (PMD2) in the state where the lateral pressure was removed (free coil state) was 0.016 ps/√km.

The difference between PMD1 and PMD2 in this case, that is, a PMD increase caused by the external factor of lateral pressure application, was approximately 0.56 ps/√km.

Thus, PMD1 value in the second comparative example was close to the value in the first comparative example. Accordingly, the difference between PMD1 and PMD2, that is, a PMD increase caused by the external factors was also a large value close to the value in the first comparative example.

This means that in the optical fiber of the second comparative example, a PMD increase caused by the external factors was not sufficiently suppressed even if the torsion was applied in the manufacturing process.

This can be understood as follows. That is, since the torsion was applied at the downstream side of the pickup capstan 36, the pickup capstan 36 served as a resistance against the transmission of the torsion. Accordingly, the applied torsion was not sufficiently transmitted to the upstream side of the pickup capstan 36, so that the torsion was not applied to the bare optical fiber near the range of the coating device 20 to the coat curing device 22 located at the upstream side of the pickup capstan 36. As a result, elastic torsion remaining in the optical fiber became close to almost 0.

Furthermore, when removing the coating layer of the optical fiber and measuring the amount of a remaining torsion, a torsion in which the change has a regular cycle could not be measured.

SECOND EXAMPLE

Using the optical fiber manufacturing apparatus shown in FIG. 8 and using the device shown in FIG. 3 as the twisting device 26 in the manufacturing apparatus, an optical fiber to which elastic torsion (twist) was applied to a silica glass based optical fiber with a two-layer coat structure, which had characteristics of a typical single-mode fiber, according to the above-described method of the invention was manufactured.

The drawing speed (fiber drawing speed) from the optical fiber preform was set to 1500 mm/min.

In addition, a method of coating different coating resins at two places (wet on dry method) as shown in FIG. 8 was applied as a coating-curing method.

A UV curable urethane acrylate based resin (Young's modulus at the time of curing was 1.0 MPa) was used as a resin (primary material) of the first coating layer, and a UV curable urethane acrylate based resin (Young's modulus at the time of curing was 500 MPa) was used as a resin (secondary material) of the second coating layer.

Moreover, as the viscosity of liquid resin at the time of coating of the above-described material, the viscosity of the primary material was adjusted to 3 Pa·sec and the viscosity of the secondary material was adjusted to 0.1 Pa·sec, and the primary material in the liquid state was coated by the first coating device 20A and then cured by a UV lamp which was the primary coat curing device 22A.

Then, the secondary material was coated by the secondary coating device 20B and then cured by a UV lamp which was the secondary coat curing device 22B.

Torsion was applied immediately after the process of curing the secondary material by the secondary coat curing device 22B.

In addition, at the upstream side of the twisting device 26, fiber drawing was performed in a state where there was no physical contact with an optical fiber except for the coating resin.

Here, the profile of the torsion in a longitudinal direction of the optical fiber, which was applied to the optical fiber 24 by the twisting device 26, was a sine wave which had a periodically reversed torsional direction, and the swing angle and the swing speed of the twisting device were set such that the period T became 5 m and the maximum amplitude MA of the accumulated torsion angle became 2500°.

The optical fiber 24 after passing the twisting device 26 was picked up through the guide pulley 28 by a pickup device (not shown) and was wound through a dancer pulley by a winding device. As a result, an optical fiber in which elastic torsion (twist) was applied to a bare optical fiber portion was obtained.

In the obtained optical fiber, the diameter of the bare optical fiber was 125 µm, the primary diameter of the external diameter of the coat (external diameter of the first coating layer)

was 190 μm, and the secondary diameter (external diameter of the second coating layer) was 240 μm.

A sample was manufactured by rewinding the optical fibers in the second example, which were manufactured and wound as described above, using a rewinding device while securing a distance (free length) of 10 m so as not to be in physical contact with a member, such as a pulley, so that the torsion applied to the optical fibers was removed.

For the manufactured sample, lateral pressure was intentionally applied to the optical fibers under the same conditions as in the first example.

That is, a PMD measurement was executed using the same method as in the first example after the sample was left for 1 hour or more under the conditions, in which a PMD was likely to occur due to external factors, for stabilization of fiber temperature.

As a result, 0.08 ps/√km which was a very small value was acquired as a PMD value (PMD1) when the lateral pressure was applied.

On the other hand, a PMD was measured again for the same optical fiber as the optical fiber used in the above sample under the same conditions as described above when the optical fiber was in a free coil state (when the lateral pressure was removed). As a result, a PMD value (PMD2) in the free coil state was 0.01 ps/√km.

Here, the difference between PMD1 and PMD2 could be suppressed to 0.07 ps/√km which was a very small value.

When removing the coating layer of the optical fiber and measuring the amount of a remaining torsion, an inversion period T of the remaining elastic torsion was 5 m and the maximum amplitude of an accumulated torsion angle was 750°.

Accordingly, in the case of manufacturing an optical fiber with a 2-layer coating structure, it was confirmed that an optical fiber, in which a PMD increase caused by lateral pressure application, that is, an external factor was significantly small even if coating and curing were performed at two places (even if a configuration was provided in which coating and curing of each layer were performed sequentially), could be obtained.

THIRD EXAMPLE

An optical fiber with a 2-layer coating structure was manufactured while giving elastic torsion (twist) in the same manner as in the second example.

In addition, as the viscosity of coating resin at the time of coating (in a liquid state), the viscosity of the primary material was adjusted to 3 Pa·sec and the viscosity of the secondary material was adjusted to 0.1 Pa·sec, in the same manner as in the second example.

The profile of the torsion in a longitudinal direction of an optical fiber, which was applied to the optical fiber by the twisting device, was a trapezoidal wave which had a periodically reversed torsional direction, and the swing angle and the swing speed of the twisting device were set such that the period T became 30 m and the maximum torsion angle MA of the accumulated torsion angle became 120000°.

The optical fiber after passing the twisting device was picked up by a pickup device and was wound through a dancer pulley by a winding device. As a result, an optical fiber in which elastic torsion (twist) was applied to a bare optical fiber portion was obtained.

In the obtained optical fiber, the diameter of the bare optical fiber was 125 μm, the primary diameter of the external diameter of the coat was 180 μm, and the secondary diameter was 260 μm.

A sample was manufactured by rewinding the optical fibers in the third example, which were manufactured and wound as described above, using a rewinding device while securing a distance (free length) of 40 m so as not to be in physical contact with a member, such as a pulley, so that the torsion applied to the optical fibers was removed.

For the manufactured sample, lateral pressure was intentionally applied to the optical fibers under the same conditions as in the first example.

That is, a PMD measurement was executed using the same method as in the first example after the sample was left for 1 hour or more under the conditions, in which a PMD was likely to occur due to external factors, for stabilization of fiber temperature.

As a result, 0.06 ps/√km which was a very small value was acquired as a PMD value (PMD1) when the lateral pressure was applied.

On the other hand, a PMD was measured again for the same optical fiber as the optical fiber used in the above sample under the same conditions as described above when the optical fiber was in a free coil state (when the lateral pressure was removed). As a result, a PMD value (PMD2) in the free coil state was 0.03 ps/√km.

Here, the difference between PMD1 and PMD2 could be suppressed to 0.03 ps/√km which was a very small value.

When removing the coating layer of the optical fiber and measuring the amount of a remaining torsion, an inversion period T of the remaining elastic torsion was 30 m and the maximum amplitude of an accumulated torsion angle was 24000°.

Accordingly, it was confirmed that also in the optical fiber obtained in the third example, a PMD increase caused by lateral pressure application, that is, external factors could be suppressed to the significantly small value.

THIRD COMPARATIVE EXAMPLE

An optical fiber with a 2-layer coating structure was manufactured while giving elastic torsion (twist) in the same manner as in the third example.

As the viscosity of coating resin at the time of coating, the viscosity of the primary material was adjusted to 3.5 Pa·sec and the viscosity of the secondary material was adjusted to 0.5 Pa·sec.

The profile of the torsion in a longitudinal direction of the optical fiber, which was applied to the optical fiber by the twisting device, was a sine wave which had a periodically reversed torsional direction, and the swing angle and the swing speed of the twisting device were set such that the period T became 5 m and the maximum amplitude MA of the accumulated torsion angle became 2500°.

The optical fiber after passing the twisting device was picked up by a pickup device and was wound through a dancer pulley by a winding device. As a result, an optical fiber in which elastic torsion (twist) was applied to a bare optical fiber portion was obtained.

In the obtained optical fiber, the diameter of the bare optical fiber was 125 μm, the external diameter (primary diameter) of the first coating layer of the coating layer was 180 μm, and the external diameter (secondary diameter) of the second coating layer was 260 μm.

A sample was manufactured by rewinding the optical fibers in the third comparative example, which were manufactured and wound as described above, using a rewinding device while securing a distance (free length) of 10 m so as not to be in physical contact with a member, such as a pulley, so that the torsion applied to the optical fibers was removed.

For the manufactured sample, lateral pressure was intentionally applied to the optical fibers under the same conditions as in the first example.

That is, a PMD measurement was executed using the same method as in the first example after the sample was left alone for 1 hour or more under the conditions, in which a PMD was likely to occur due to external factors, for stabilization of fiber temperature.

As a result, a PMD value (PMD1) at the time of lateral pressure application was 0.25 ps/√km which was a value smaller than that in the case where elastic torsion (twist) was not applied but larger than that in the third example.

In addition, a PMD was measured again for the same optical fiber as the optical fiber used in the above sample under the same conditions as described above when the optical fiber was in a free coil state (when the lateral pressure was removed). As a result, a PMD value (PMD2) in the free coil state was 0.025 ps/√km.

Here, the difference between PMD1 and PMD2 was approximately 0.22 ps/√km which was a value smaller than those in the first and second comparative examples but larger than that in the third example.

When removing the coating layer of the optical fiber and measuring amount of a remaining torsion, an inversion period T of the remaining elastic torsion was 5 m and the maximum amplitude of an accumulated torsion angle was 100°.

This can be understood as follows. That is, since the viscosity of resin (primary material) of the first coating layer at the time of coating was high, transmission of torsion and reversion of the torsion in the torsional direction were inhibited and accordingly, the torsion was offset before curing of the primary material by UV irradiation. As a result, the torsion remaining in the optical fiber after coating was reduced.

FOURTH COMPARATIVE EXAMPLE

An optical fiber with a 2-layer coating structure was manufactured while giving elastic torsion (twist) in the same manner as in the third example.

As the viscosity of liquid-state resin at the time of coating, the viscosity of the primary material was adjusted to 2.0 Pa·sec and the viscosity of the secondary material was adjusted to 0.05 Pa·sec.

The profile of the torsion in a longitudinal direction of the optical fiber, which was applied to the optical fiber by the twisting device, was a sine wave which had a periodically reversed torsional direction, and the swing angle and the swing speed of the twisting device were set such that the period T became 5 m and the maximum amplitude MA of the accumulated torsion angle became 2500°.

The optical fiber after passing the twisting device was picked up by a pickup device and was wound through a dancer pulley by a winding device. As a result, an optical fiber in which elastic torsion (twist) was applied to a bare optical fiber portion was obtained.

In the obtained optical fiber, the diameter of the bare optical fiber was 125 μm, the external diameter (primary diameter) of the first coating layer of the coating layer was 180 μm, and the external diameter (secondary diameter) of the second coating layer was 260 μm. However, the change in the external diameter (secondary diameter) of the second coating layer was ±5 μm which was a significantly large value.

This is because the viscosity of the liquid-state resin (secondary material) of the second coating layer was low and accordingly, coating was not stable.

Since such an optical fiber was not suitable for practical use, a PMD evaluation was not performed.

FIFTH COMPARATIVE EXAMPLE

An optical fiber with a 2-layer coating structure was manufactured while giving elastic torsion (twist) in the same manner as in the first example.

However, the profile of the applied torsion was made to be different from that in the first example.

That is, the profile of the torsion in a longitudinal direction of the optical fiber, which was applied to the optical fiber by the twisting device, was a sine wave which had a periodically reversed torsional direction, and the swing angle and the swing speed of the twisting device were set such that the period T became 3 m and the maximum amplitude MA of the accumulated torsion angle became 1500°.

The optical fiber after passing the twisting device was picked up by a pickup device and was wound through a dancer pulley by a winding device. As a result, an optical fiber in which elastic torsion (twist) was applied to a bare optical fiber portion was obtained.

In the obtained optical fiber, the diameter of the bare optical fiber was 125 μm, the external diameter (primary diameter) of the first coating layer of the coating layer was 200 μm, and the external diameter (secondary diameter) of the second coating layer was 250 μm.

A sample was manufactured by rewinding the optical fibers in the fifth comparative example, which were manufactured and wound as described above, using a rewinding device while securing a distance (free length) of 10 m so as not to be in physical contact with a member, such as a pulley, so that the torsion applied to the optical fibers was removed.

For the manufactured sample, lateral pressure was intentionally applied to the optical fibers under the same conditions as in the first example.

That is, a PMD measurement was executed using the same method as in the first example after the sample was left for 1 hour or more under the conditions, in which a PMD was likely to occur due to external factors, for stabilization of fiber temperature.

As a result, a PMD value (PMD1) at the time of lateral pressure application was 0.4 ps/√km which was a value smaller than those in the first and second comparative examples but which was a relatively large value.

In addition, a PMD was measured again for the same optical fiber as the optical fiber used in the above sample under the same conditions as described above when the optical fiber was in a free coil state (when the lateral pressure was removed). As a result, a PMD value (PMD2) in the free coil state was 0.02 ps/√km.

When removing the coating layer of the optical fiber and measuring the amount of a remaining torsion, an inversion period T of the remaining elastic torsion was 3 m and the maximum amplitude of an accumulated torsion angle was 200°.

Here, it is thought that the reason why a PMD value (PMD1) at the time of lateral pressure application became a relatively large value was that a period of the twist applied to the optical fiber was relatively short and accordingly a part of the applied twist was removed and the remaining twist was reduced.

Also in this case, however, it is apparent that the increase in a PMD value (PMD1) at the time of lateral pressure application is smaller than that in the case where no twist is applied.

SIXTH COMPARATIVE EXAMPLE

An optical fiber with a 2-layer coating structure was manufactured while giving elastic torsion (twist) in the same manner as in the first example.

However, the profile of the torsion was made to be different from that in the first example.

That is, the profile of the torsion in a longitudinal direction of the optical fiber, which was applied to the optical fiber by the twisting device, was a sine wave which had a periodically reversed torsional direction, and the swing angle and the swing speed of the twisting device were set such that the period T became 15 m and the maximum amplitude MA of the accumulated torsion angle became 65000°.

The optical fiber after passing the twisting device was picked up by a pickup device and was wound through a dancer pulley by a winding device. As a result, an optical fiber in which elastic torsion (twist) was applied to a bare optical fiber portion was obtained.

In the obtained optical fiber, the diameter of the bare optical fiber was 125 µm, the external diameter (primary diameter) of the first coating layer of the coating layer was 200 µm, and the external diameter (secondary diameter) of the second coating layer was 250 µm.

A sample was manufactured by rewinding the optical fibers in the sixth comparative example, which were manufactured and wound as described above, using a rewinding device while securing a distance (free length) of 30 m so as not to be in physical contact with a member, such as a pulley, so that the torsion applied to the optical fibers was removed.

For the manufactured sample, lateral pressure was intentionally applied to the optical fibers under the same conditions as in the first example.

That is, a PMD measurement was executed using the same method as in the first example after the sample was left for 1 hour or more under the conditions, in which a PMD was likely to occur due to external factors, for stabilization of fiber temperature.

As a result, a PMD value (PMD1) at the time of lateral pressure application became 0.04 ps/√km which was a low value.

In addition, a PMD was measured again for the same optical fiber as the optical fiber used in the above sample under the same conditions as described above when the optical fiber was in a free coil state (when the lateral pressure was removed). As a result, a PMD value (PMD2) in the free coil state was 0.02 ps/√km.

When removing the coating layer of the optical fiber and measuring the amount of a remaining torsion, an inversion period T of the remaining elastic torsion was 15 m and the maximum amplitude of an accumulated torsion angle was 15000°.

Thus, the sixth comparative example was also effective for reducing a PMD at the time of lateral pressure application.

However, when the coating layer was observed after putting the optical fiber into the constant temperature bath and performing a heat cycle test of −40° C. to +80°, it was confirmed that cracks occurred in the coating layer.

A mechanism of occurrence of the cracks in the coating layer can be understood as follows. That is, since the amount of torsion applied to the optical fiber was too large, stress applied to the coating layer became excessive and this caused the occurrence of cracks.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical fiber manufacturing method comprising:
   melting an optical fiber preform by heating;
   drawing a bare optical fiber with a predetermined diameter from the melted optical fiber preform;
   solidifying the drawn bare optical fiber;
   applying elastic torsion to the bare optical fiber after solidification by transmitting elastic torsion to the bare optical fiber toward an upstream side in a drawing direction of the bare optical fiber;
   forming a coating layer before curing by coating an outer periphery of the solidified bare optical fiber with curable resin in a liquid state;
   forming an optical fiber, to which torsion is applied so that the elastic torsion of the bare optical fiber is held, by curing the coating layer formed on the outer periphery of the bare optical fiber to which the elastic torsion is applied; and
   drawing the optical fiber to which the torsion is applied, wherein
   when applying torsion to the optical fiber, a direction of the torsion applied to the bare optical fiber is periodically reversed,
   when the bare optical fiber is coated with curable resin, a viscosity of the liquid-state curable resin at the time of coating is 0.1 to 3 Pa·sec,
   an inversion period T of the torsion applied to the optical fiber in a longitudinal direction of the optical fiber is 5 to 30 m. and a maximum amplitude of an accumulated torsion angle in an inverted torsion profile is 500×T (°) to 4000×T (°),
   an inversion period T is the range of 5 to 30 m in the longitudinal direction of the optical fiber and a maximum amplitude of an accumulated torsion angle of the bare optical fiber portion in an inverted torsion profile is 100×T (°) to 1200×T (°) under the condition where a remaining elastic torsion is applied to the bare optical fiber portion in a state where the elastic torsion applied to the bare optical fiber portion is held by the elastic repulsion caused by the coating layer, and
   the elastic torsion of the bare optical fiber is held by curing the coating layer so that 20% to 30% of applied elastic torsion remains.

2. The optical fiber manufacturing method according to claim 1,
   wherein a twisting device is used to apply torsion to the bare optical fiber, and
   torsion is applied to the bare optical fiber in a state where a member, the member preventing transmission of the torsion of the bare optical fiber, is not present at an upstream side of the twisting device.

* * * * *